Feb. 19, 1924. 1,484,373
C. A HOY
CONVEYER FOR THE BUTT REMOVERS OF CORN HUSKERS, ETC
Filed Jan. 15, 1921 2 Sheets-Sheet 1
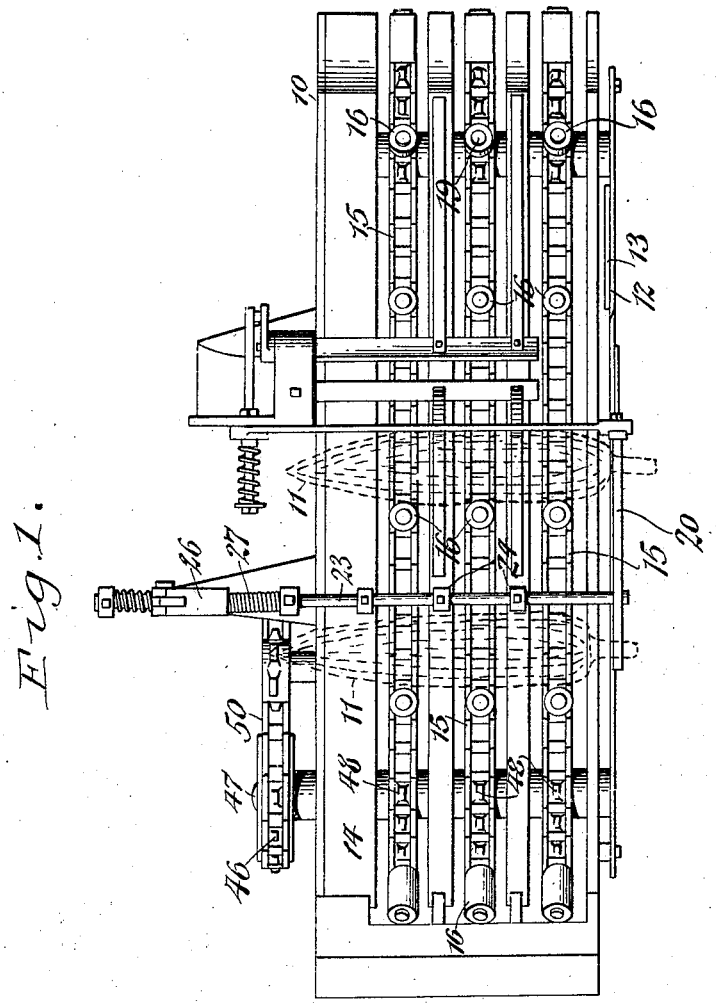
Inventor
Clarence A. Hoy
by Geyer & Popp
Attorneys Feb. 19, 1924.
1,484,373
C. A. HOY
CONVEYER FOR THE BUTT REMOVERS OF CORN HUSKERS, ETC
Filed Jan. 15, 1921
2 Sheets-Sheet 2
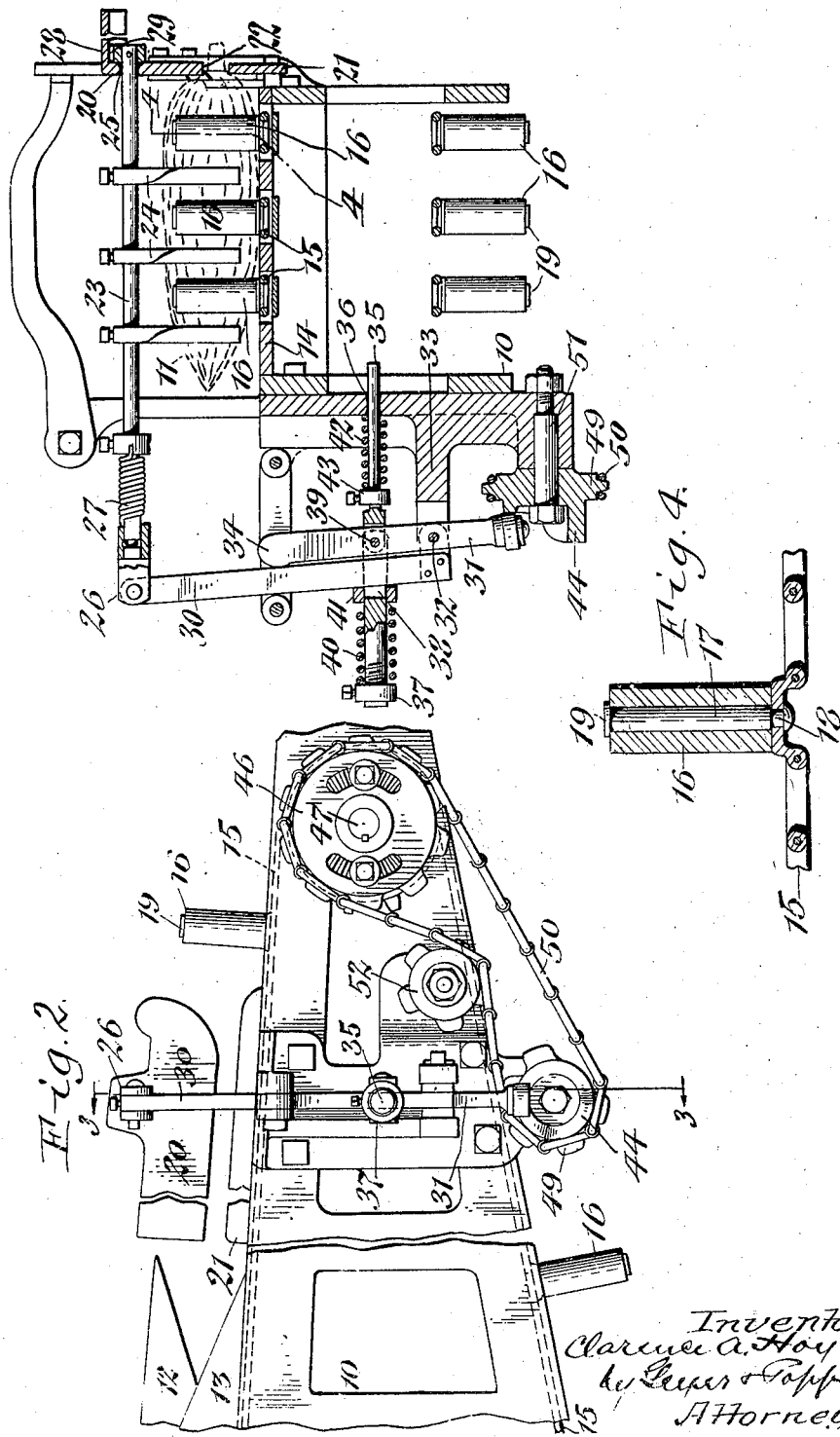

Patented Feb. 19, 1924.

1,484,373

UNITED STATES PATENT OFFICE.

CLARENCE A. HOY, OF BUFFALO, NEW YORK, ASSIGNOR TO PEERLESS HUSKER COMPANY, OF BUFFALO, NEW YORK, A COPARTNERSHIP.

CONVEYER FOR THE BUTT REMOVERS OF CORN HUSKERS, ETC.

Application filed January 15, 1921. Serial No. 437,422.

*To all whom it may concern:*

Be it known that I, CLARENCE A. HOY, a citizen of the United States, residing in Buffalo, in the county of Erie and State of New York, have invented new and useful Improvements in Conveyers for the Butt Removers of Corn Huskers, &c., of which the following is a specification.

This invention relates to a conveyer for propelling ears of corn and more particularly to a conveyer for use in an apparatus for removing the butt ends of ears of corn preparatory to removing the husks from these ears and cutting the kernels therefrom.
In machines of this character, as heretofore constructed the conveyer which propelled the ears past the gaging and cutting mechanism was provided with rigid feed or carrying wings which frictionally resisted the movement of the ears toward the gage under the action of the positioning device and thus interfered with the positive gaging of the ears.

The object of this invention is to provide the conveyer with carrying members which are pivoted on the conveyer and present a rolling surface to the ears of corn whereby the same are free to be moved crosswise of the conveyer and toward the gage under the action of the positioning device and thus ensure proper gaging of the ears at all times preparatory to cutting off the butts thereof.

In the accompanying drawings:
Figure 1 is a top plan view of a machine for removing the butt ends of ears of corn equipped with my improvements. Figure 2 is a fragmentary side elevation of the same, on an enlarged scale. Figure 3 is a cross section taken on line 3—3, Fig. 2. Figure 4 is a fragmentary vertical longitudinal section, on an enlarged scale, taken on line 4—4, Fig. 3.

Similar characters of reference refer to like parts throughout the several views.

10 represents the main frame of the machine which may be of any suitable construction to support the several working parts of the machine.
On one side of the rear part of the frame is mounted the cutter whereby the butt ends of the ears of corn 11 are cut from the bodies thereof for the purpose of severing the stubs or stems therefrom and also loosening the husks adjacent to the rearmost kernels of the ears. This cutter may be variously constructed but, as shown in the drawings, the same consists of upper and lower blades 12, 13, which have inclined cutting edges arranged to converge rearwardly so that when the butt end of an ear is moved against these cutting edges the same will be severed from the body of the ear.

The ears of corn which are to be trimmed preparatory to being husked are placed in a crosswise position on the front part of a table 14 where the same are engaged by a longitudinal conveyer which moves the ears past the positioning means and the end or butt cutter. In its preferred form this conveyer includes a plurality of longitudinal chain belts 15 arranged side by side and movable forwardly with their operative upper stretches.

For the purpose of enabling the conveyer to positively carry the ears of corn, carrying means are provided which are constructed to form a rolling surface on the conveyer. These carrying means consist of a plurality of transverse rows of rollers 16 arranged at suitable intervals on the conveyer and projecting laterally therefrom or perpendicularly to the face of the active part of the conveyer. Each of these rollers is pivotally mounted on one of the chain conveyer belts by means of a pivot pin 17 which projects laterally from this belt. This pin is provided at its inner end with a reduced neck 18 which is secured to the chain belt while its outer end is provided with a head 19 so that the roller 16 journaled on this pin is held against axial displacement between the chain belt and the head 19, as best shown in Fig. 4.

These ears of corn are carried forwardly in a cross-wise position while engaged on their undersides by the conveyer belts and on their rear sides by the carrying rollers and before reaching the cutter the same are moved transversely relatively to the conveyer belts and carrying rollers and toward a gage by a positioning or placing device so that the ears are severed properly at the butt ends thereof. In its preferred form the gaging device is constructed as follows:

20, 21 represent the upper and lower longitudinal bars of a gage which are suitably mounted on the main frame and form a longitudinal slot 22 therebetween. These bars are arranged slightly outside of the cutting line of the cutter, so that when an ear is engaged at its butt end with the gage bars and its stub projecting through the slot between the same and then moved forwardly past the cutter, the butt end of the ear will be severed from the body the requisite extent.

The positioning device whereby the ears are moved crosswise of the conveyer and against the gage includes a shifting rod 23 arranged horizontally and transversely above the path of the ears and provided with a plurality of shifting fingers 24 which are adapted to project downwardly therefrom into the path of the ears of corn and to be engaged thereby. The shifting rod is capable of rotation and also reciprocation lengthwise of its axis and for this purpose the same is guided at one end in an opening 25 in the upper guide bar 20, while its opposite end is journaled in a transversely reciprocating head 26 but compelled to move with the latter horizontally and transversely of the conveyer. The shifting rod and fingers are yieldingly held in a position in which the latter depend from the rod and into the path of the ears of corn, this being preferably accomplished by a spring 27 surrounding the rod and connected at one end thereto while its opposite end is connected with the shifting head. As the ears, during their forward movement, engage with the fingers the latter are shifted sidewise and carry the ears with their butts against the gage and at the same time the fingers are lifted by the ears until the latter clear the same, after which the fingers are again returned to their normal pendent position ready to be engaged by the next ear. In order to positively arrest the return swinging motion of the fingers so that they always stand in a definite position relatively to the path of the ears a stop device is provided which preferably consists of a fixed stop shoulder 28 arranged on the upper gate bar and a stop arm 29 arranged on the shifting arm and adapted to slide on said shoulder and also arrest the return movement of the fingers when the latter reach a position perpendicular to the path of the ears of corn as the same are moved forwardly by the conveyer.

The reciprocating motion of the shifting rod and the parts associated therewith is produced by means which are so constructed that when this rod or the fingers mounted thereon should strike an obstruction or meet with unduly strong resistance, this actuating device will yield and thus avoid breaking of parts or clogging of the machine. The preferred means for accomplishing this purpose include an upright rock lever having an upper arm 30 and a lower arm 31, said upper arm being pivoted at its lower end by a pin 32 on a bracket 33 forming part of the main frame while its upper end is pivotally connected with the shifting head 26, and said lower arm having its upper end pivoted on said pin 32 and provided with an upward extension 34 which is yieldingly connected with said upper arm. This yielding connection comprises a tension rod 35 having its inner end guided in an opening 36 in the bracket 33 and its outer end provided with a collar 37 while its intermediate part has a longitudinal slot 38 in which the upper arm moves freely but the central part of said extension is pivotally mounted therein by a pin 39. The upper arm and the extension of the lower arm are held yieldingly together by a spring 40 which surrounds the outer part of the tension rod and bears at its outer end against the collar 37 while its inner end bears against a sleeve 41 which slides on the tension rod and engages with the outer side of the upper lever. The rock lever is turned in a direction in which its upper arm swings outwardly and its lower arm inwardly by means of a spring 42 which surrounds the inner part of the tension rod and bears at its inner end against said bracket 33 while its outer end bears against a collar 43 which is secured to the tension rod. The operative movement of the rock lever in which its upper arm moves inwardly and its lower arm outwardly is effected by a rotary cam 44 which engages the lower arm of this lever. When the high part of this cam engages the lower lever arm the lever is moved in a direction for causing the shifting rod and fingers to move forward and shift an ear of corn transversely on the conveyer and toward the gage.

47 represents a shaft journaled transversely in suitable bearings on the main frame and having sprocket wheels 48 secured thereto around which the chain belts of the longitudinal conveyer pass. The driving shaft 47 is operatively connected with the cam 44 by a driving sprocket wheel 46 mounted on the driving shaft, a driven sprocket wheel 49 connected with the cam 44, and a chain belt 50 passing around said driving and driven sprocket wheels. The sprocket wheel 49 and the cam 44 are preferably formed in one piece and journaled on a pin 51 secured to the bracket 33. One of the stretches of this belt preferably passes around an idle sprocket wheel 52 which is secured to the main frame.

As the ears of corn are moved crosswise of the conveyer toward the gage by the fingers of the positioning device the rolling surface provided by the carrying rollers of the conveyer belts reduces the frictional resistance of the carrying members of the conveyer belts to a minimum and thus permits of practical certainty of operation of the positioning device in its action of moving the ears laterally against the gage preparatory to cutting the butt ends of the ears, thereby insuring easier and better removal of the husk and kernals by the subsequent operation of the husking devices and kernal cutting devices.

I claim as my invention:

A trimming apparatus for removing the butt ends of ears of corn comprising a conveyer provided with an operative portion moving lengthwise and arranged substantially horizontal and adapted to support the ears of corn to be trimmed on its upper side and in a position crosswise of the direction of movement of the operative portion of the conveyer, a gage arranged along one longitudinal edge of the operative part of the conveyer and adapted to be engaged by one end of the ear of corn, a cutter past which the gaged end of the ear is adapted to be moved by the conveyer, a plurality of wings arranged at intervals on said conveyer throughout the length thereof and adapted to engage with the rear side of said ears and composed of a plurality of rollers projecting at right angles from said conveyer and pivotally mounted on the latter and arranged in a transverse row on the same, and a positioning device adapted to engage with the front and top sides of said ears and move the same transversely on the conveyer and the rows of wings and toward said gage.

CLARENCE A. HOY.